United States Patent [19]

Raque et al.

[11] Patent Number: 5,318,629
[45] Date of Patent: Jun. 7, 1994

[54] SPREADING APPARATUS FOR SPREADING A MATERIAL ON CONTINUOUSLY MOVING OBJECTS

[75] Inventors: Glen F. Raque; Edward A. Robinson; Larry A. Allen, all of Louisville, Ky.; Vola B. Edwards, Jeffersonville, Ind.

[73] Assignee: Raque Food Systems, Inc., Louisville, Ky.

[21] Appl. No.: 816,188

[22] Filed: Jan. 2, 1992

[51] Int. Cl.$^5$ .................................... B05C 11/02
[52] U.S. Cl. .................................... 118/18; 118/25; 118/111; 118/112; 118/102; 118/120; 118/113; 99/494; 99/450.1; 15/179; 427/359
[58] Field of Search .............. 118/18, 25, 111, 112, 118/100, 113, 120, 123, 262, 118, 102; 99/494, 450.1; 15/179; 427/359

[56] References Cited

U.S. PATENT DOCUMENTS

| 911,702 | 2/1909 | Carroll | 15/179 |
|---|---|---|---|
| 1,763,363 | 6/1930 | Möller | 118/120 |
| 1,903,867 | 4/1933 | Lehmann | 15/179 |
| 2,191,268 | 2/1940 | Zuen | 118/18 |
| 2,885,996 | 5/1959 | Simmonds | 118/18 |
| 3,044,442 | 7/1962 | Pott | 118/111 |
| 3,450,069 | 6/1969 | Santa Cruz | 118/18 |
| 3,584,328 | 6/1971 | Lechene et al. | 15/179 |
| 3,682,078 | 8/1972 | Parker et al. | 118/111 |
| 3,685,744 | 8/1972 | Ludy, Jr. | 118/25 |
| 3,860,990 | 1/1975 | Petruzzi . | |
| 3,908,584 | 9/1975 | Raque | 118/25 |
| 3,982,033 | 9/1976 | Zito . | |
| 4,134,361 | 1/1979 | Benjamin | 118/120 |
| 4,190,684 | 2/1980 | Barwell et al. | 118/120 |
| 4,197,794 | 4/1980 | Raque et al. . | |
| 4,278,482 | 7/1981 | Poteet et al. | 118/123 |
| 4,566,506 | 1/1986 | Cramer et al. | 118/25 |
| 4,699,297 | 10/1987 | Raque et al. . | |
| 4,738,218 | 4/1988 | Toncelli | 118/111 |
| 4,771,726 | 9/1988 | Fitch, Jr. | 118/25 |
| 4,871,588 | 10/1989 | Cuddy et al. | 118/110 |
| 4,976,995 | 12/1990 | Gardiner | 118/112 |
| 5,121,677 | 6/1992 | LeClaire et al. | 118/18 |

FOREIGN PATENT DOCUMENTS

| 2485340 | 12/1981 | France | 118/18 |
|---|---|---|---|
| 23156 | of 1913 | United Kingdom | 118/18 |
| 149278 | 5/1921 | United Kingdom | 118/102 |
| 2060468 | 5/1981 | United Kingdom . | |

Primary Examiner—W. Gary Jones
Assistant Examiner—Todd J. Burns
Attorney, Agent, or Firm—Barnes & Thornburg

[57] ABSTRACT

An apparatus is provided for spreading a material on an object. The apparatus includes a continuously moving conveyor for moving the object in a downstream direction, and a dispenser for applying the material to the object. The apparatus also includes a carriage located above the conveyor, and a spreader coupled to the carriage for engaging the material applied to the object by the dispenser to spread the material on the object. The apparatus further includes a mechanism for moving the carriage in the downstream direction over the continuously moving object as the spreader engages the material, and another mechanism for providing movement of the spreader relative to the carriage from an first position in which the spreader engages the material to a second position in which the spreader disengages the material.

45 Claims, 4 Drawing Sheets

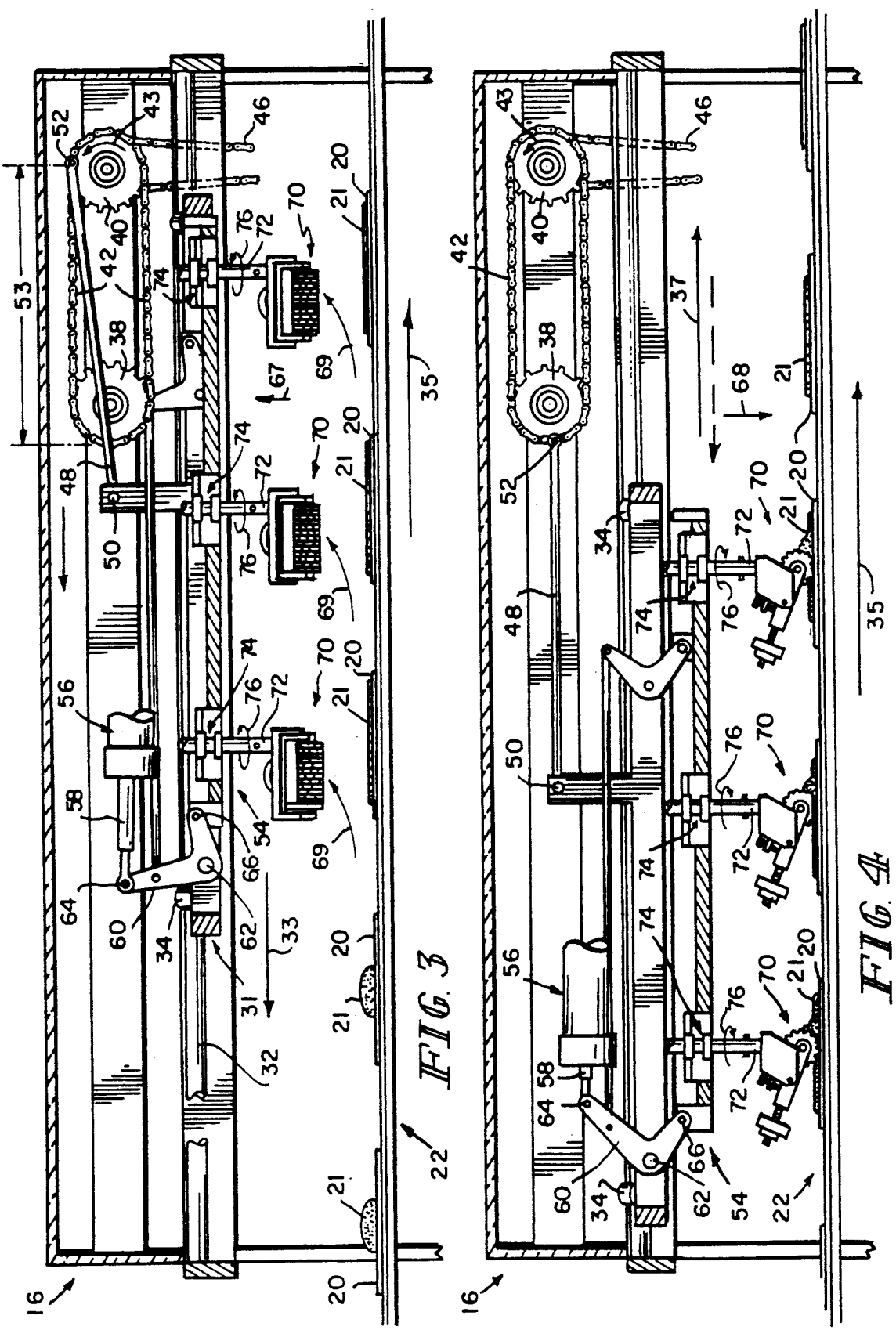

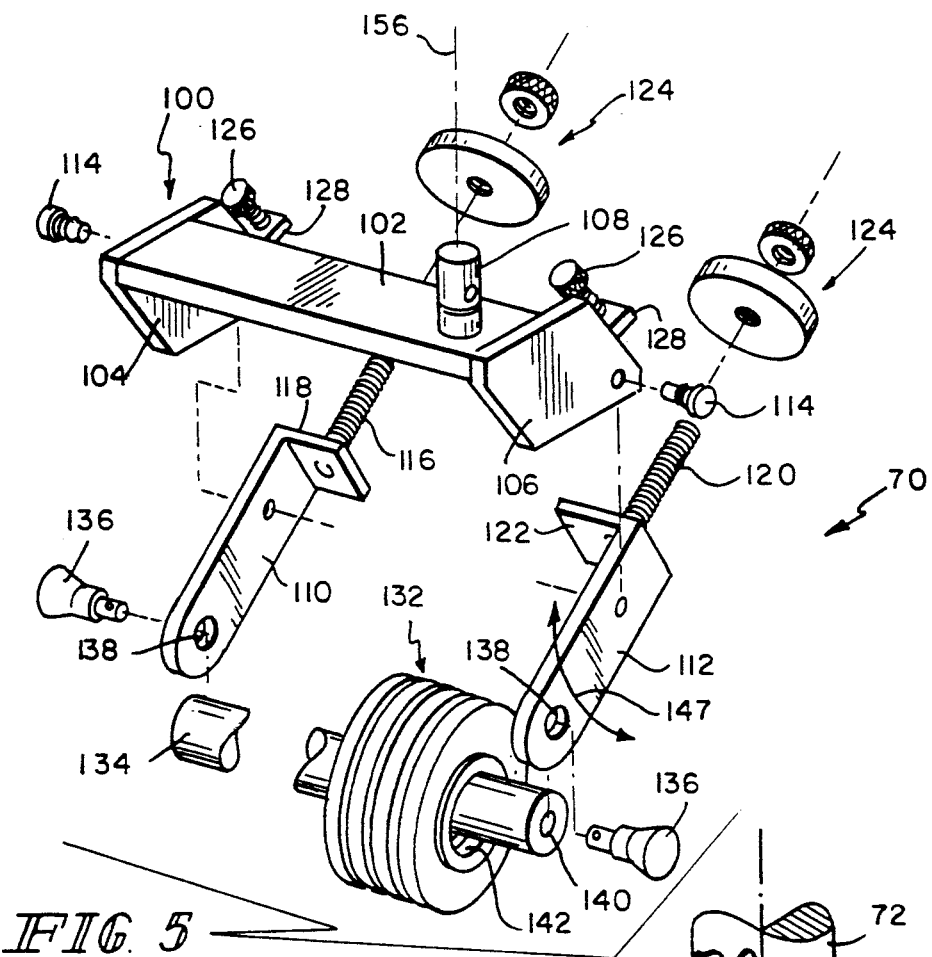
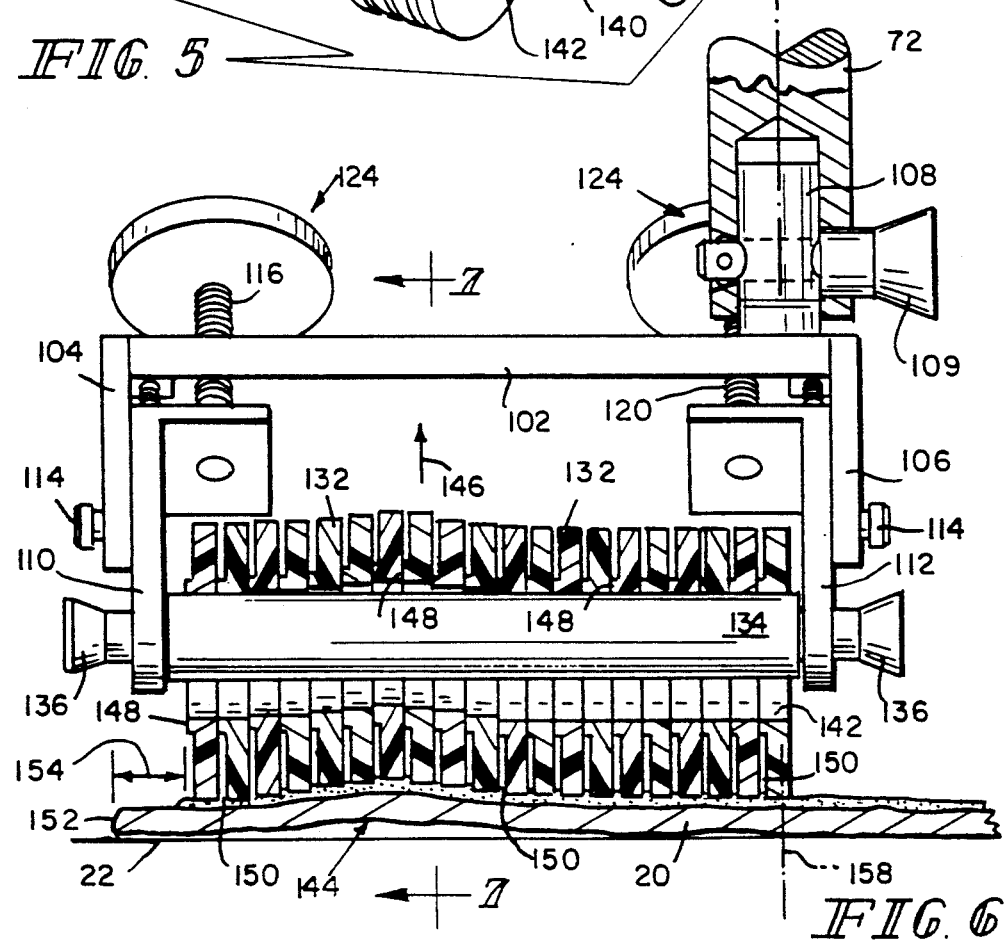

SPREADING APPARATUS FOR SPREADING A MATERIAL ON CONTINUOUSLY MOVING OBJECTS

BACKGROUND AND SUMMARY OF THE INVENTION

This invention relates to a spreading apparatus for spreading a material on an object. More particularly, the present invention relates to a sauce spreading apparatus which controls spreading of sauce on a crust.

In conventional pizza topping devices, pizza crusts are transported along a conveyor beneath a sauce applying apparatus. A conventional sauce applying apparatus includes a sauce hopper located beneath the conveyor and a pump which pumps sauce from the hopper to spray nozzles located above the upper surface of the conveyor. Sauce or other suitable material is applied uniformly to the crusts traveling along the conveyor. Excess sauce which does not hit the crusts passes through apertures formed in the conveyor and returns to the hopper to be reused. In conventional sauce applying devices, sauce is applied to the entire surface of the crusts without the device touching the crusts. Such a conventional sauce applying apparatus is disclosed in U.S. Pat. No. 4,197,794.

The present invention is designed to control the application of material such as sauce to the surface of an object such as a pizza crust. The application of the material is controlled by applying the material to only a predetermined section of the object and then spreading the material in a predetermined pattern on the object with a spreader. In other words, sauce can be applied to a center portion of pizza crust and spread over a predetermined section of the crust while leaving an outer edge of the crust free from sauce to permit easier handling of the pizza after it is cooked.

According to one aspect of the invention, an apparatus is provided for spreading a material on an object. The spreading apparatus includes a carriage and a spreader coupled to the carriage for spreading the material on the object. The spreading apparatus also includes means for providing movement of the spreader relative to the carriage from a first position in which the spreader engages the material to a second position in which the spreader disengages the material.

The spreading apparatus further includes means for rotating the spreader relative to the carriage to spread the material on the object. The spreading apparatus still further includes a shaft having a proximal end rotatably coupled to the carriage and a distal end. The spreader is coupled to the distal end of the shaft, and the rotating means is coupled to the shaft to rotate the shaft and the spreader relative to the carriage.

The objects can either move intermittently or continuously below the spreading apparatus. For the continuously moving objects, the spreading apparatus includes means for moving the carriage to provide reciprocating movement of the carriage alternately in a downstream direction and in an upstream direction over a stream of continuously moving objects. The means for providing movement of the spreader moves the spreader from an extended first position in which the spreader engages the material as the carriage moves in the downstream direction to a retracted second position in which the spreader disengages the material as the carriage moves in the upstream direction.

The carriage includes a carriage frame and a spreader head pivotably coupled to the carriage frame. The means for providing movement of the spreader includes a lever arm having a first end, a second end coupled to the spreader head, and a center section pivotably coupled to the carriage frame. A piston and cylinder assembly having an actuator arm is coupled to the first end of the lever arm. The actuator arm is movable from a first position to move the spreader head away from the carriage frame to extend the spreader to an second position to move the spreader head toward the carriage frame to retract the spreader.

According to another aspect of the present invention, the spreader includes a frame, an axle having a predetermined diameter coupled to the frame, and a plurality of wheels for engaging the material to spread the material on the surface. Each of the wheels is formed to include a central aperture therethrough for receiving the axle to couple the wheels to the axle. The spreading apparatus also includes means coupled to the frame for moving the frame, axle, and plurality of wheels over the surface to spread the material.

The central aperture of each wheel has a diameter larger than the predetermined diameter of the axle to permit limited movement of the wheels relative to the axle. Each of the plurality of wheels is spaced apart from an adjacent wheel by a predetermined distance. The predetermined distance between adjacent wheels varies depending upon the location of the wheel along the longitudinal axis of the axle. Each wheel includes a spacer integrally formed thereon to separate each wheel from an adjacent wheel by said predetermined distance.

The spreader further includes means for pivotably coupling the axle and the plurality of wheels to the frame to permit pivotal movement of the axle and plurality of wheels relative to the frame upon engagement of the wheels with the material. An adjustable counterweight is coupled to the coupling means to balance the axle and plurality of wheels. The spreader still further includes means for limiting the range of pivotal movement of the axle and the plurality of wheels relative to the frame. Each of the plurality of wheels is free to move independently relative to an adjacent wheel and relative to the frame to permit each of the plurality of wheels to move to a different position relative to the axle upon engagement of the wheels with the material.

In one embodiment, each of the wheels includes a plurality of teeth formed on an outer edge thereof to facilitate spreading material which includes particulate matter. In another embodiment, each of the wheels is formed to include a generally smooth outer edge to facilitate spreading of particulate-free material.

Accordingly to yet another aspect of the present invention, a spreading apparatus includes a conveyor for moving the object in a downstream direction. The apparatus also includes a dispenser for applying the material to the object, a carriage located above the conveyor, and spreading means coupled to the carriage for engaging the material applied to the object by the dispenser as the carriage moves over the object to spread the material on the object. The apparatus further includes means for providing movement of the spreading means from a first position in which the spreading engages the material to a second position in which the spreading means disengages the material.

The spreading means includes a shaft having a proximal end rotatably coupled to the carriage and a distal end and means for rotating the shaft relative to the carriage so that the spreading means rotates relative to the object to spread the material. The apparatus still further includes means for aligning the object in a predetermined position on the conveyor and means cooperating with the aligning means for positioning the spreading means over an object travelling on the conveyor so that the spreading means spreads material only on a predetermined section of the object.

The means for moving the carriage provides reciprocating movement of the carriage alternately in a downstream direction and in an upstream direction over a stream of continuously moving objects. The apparatus still further includes means for providing movement of the spreading means from an extended position in which the spreading engages the material as the carriage moves in the downstream direction to a retracted position in which the spreading means disengages the material as the carriage moves in the upstream direction.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 3 is a sectional view taken through the spreading apparatus after the apparatus has completed a sauce spreading cycle on a first series of crusts;

FIG. 4 is a sectional view similar to FIG. 3 illustrating a plurality of wheel assemblies of the spreading apparatus engaging sauce on a second series of crusts to spread the sauce on a predetermined section of the crusts;

FIG. 5 is an exploded perspective view of a wheel assembly of the present invention;

FIG. 6 is an elevational view of an assembled wheel assembly with portions broken away.

DETAILED DESCRIPTION OF THE DRAWINGS

Figure 1:
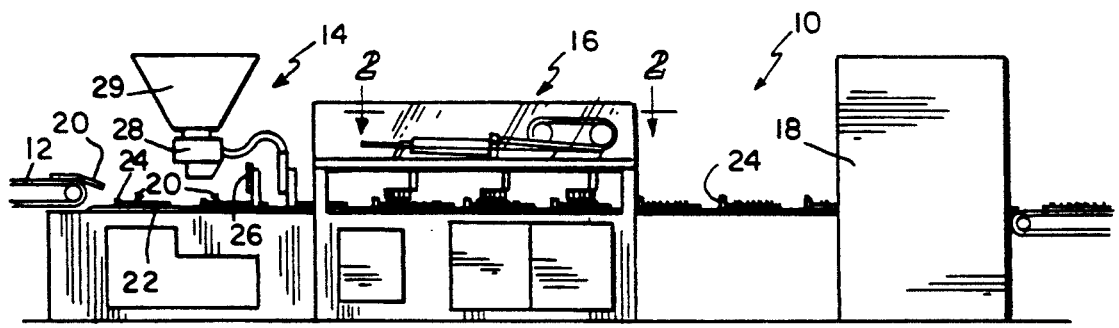
FIG. 1 is a diagrammatical view illustrating a pizza processing system which includes a spreading apparatus of the present invention for spreading sauce on crusts moving through the spreading apparatus.
Figure 2:
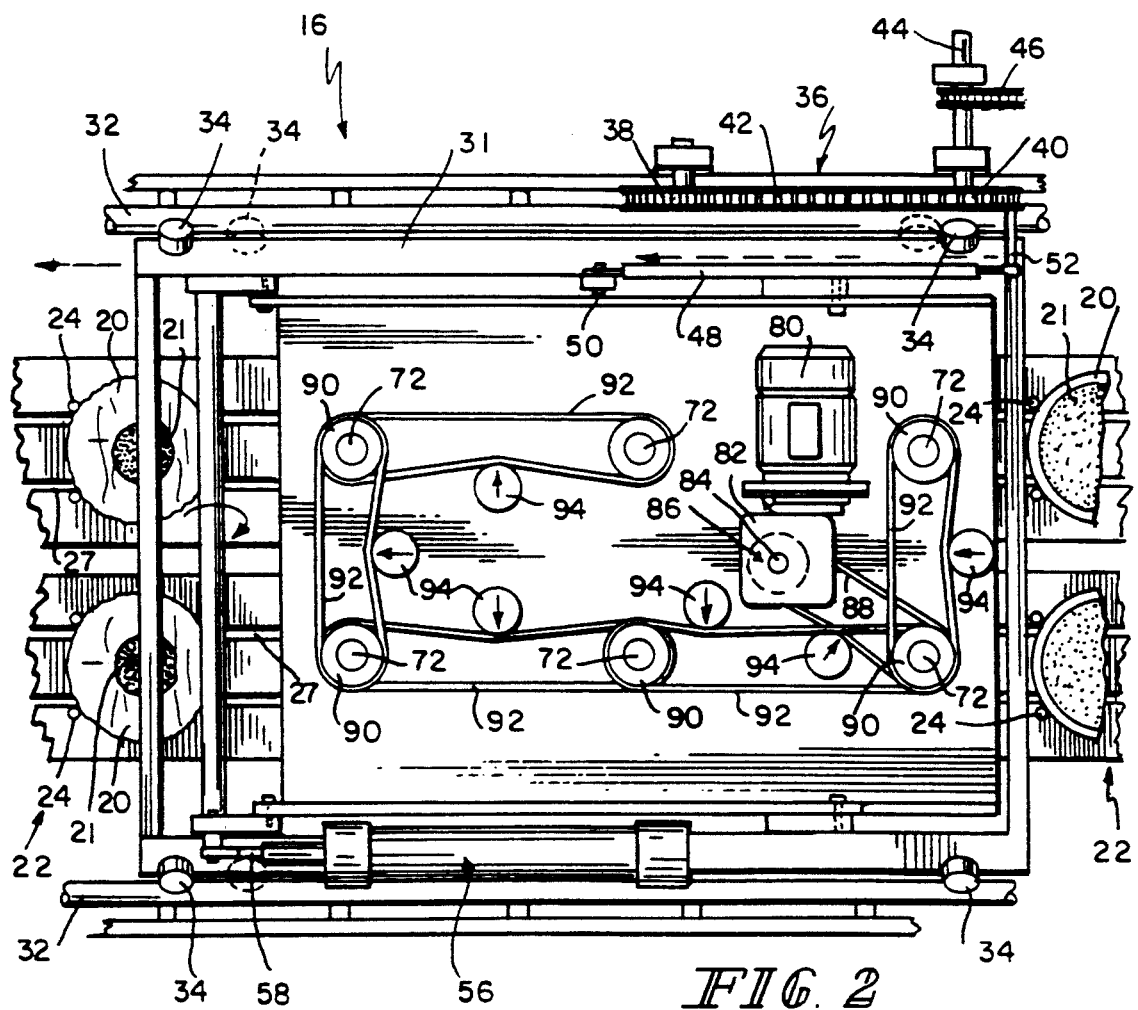
FIG. 2 is a sectional view taken along lines 2—2 of FIG. 1 illustrating a drive mechanism for the spreading apparatus.

Referring now to the drawings, FIG. 1 illustrates a pizza processing system 10 including an inlet conveyor 12, a sauce dispenser 14, a sauce spreading apparatus 16, and a topping apparatus 18. Pizza crusts 20 enter processing system 10 from inlet conveyor 12. Crusts 20 are aligned on continuously moving conveyor 22 by a plurality of alignment pegs 24 as best illustrated in FIG. 2. Operation of sauce dispenser 14 is controlled by an optical sensor 26. Optical sensor 26 detects a leading edge of each crust 20 and sends a control signal to dispenser 14 when a leading edge of crust 20 is detected. Sensor 26 is situated over an open slot 27 in conveyor 22. Open slot 27 is illustrated in FIG. 2. A light beam is directed toward sensor 26 through slot 27 from below conveyor 22. When a crust 20 passes below sensor 26, the light beam is blocked by crust 20 and sensor 26 generates a control signal to cause dispenser 14 to dispense sauce 21 onto the pizza crust 20. Dispenser 14 includes a piston and cylinder arrangement 28 and a hopper 29. Piston and cylinder arrangement 28 pumps sauce 21 from hopper 29 through outlet 30 and onto a center portion of crust 20. Operation of the dispenser 14 is described in detail in U.S. Pat. No. 4,699,297 and in U.S. Pat. No. 4,823,998, both of which are owned by the assignee of the present invention.

After sauce 21 is applied to the pizza crusts 20, conveyor 22 moves the crusts 20 into a sauce spreading apparatus 16. Crusts 20 continuously move through the entire processing system 10. Illustratively, sauce spreading apparatus 16 spreads sauce on six crusts 20 at a time. Crusts 20 move in two columns along conveyor 22. There are three rows of spreaders in spreading apparatus 16 for each of the two columns which operate simultaneously.

After the sauce 21 is evenly spread on crust 20, conveyor 22 moves the sauce-covered crusts 20 through a topping apparatus 18. The topping apparatus 18 automatically applies particulate pizza toppings to the sauce-covered crusts 20. Operation of pizza topping apparatus 18 is described in detail in U.S. Pat. No. 4,197,794 owned by the assignee of the present invention.

The sauce spreading apparatus 16 of the present invention is best illustrated in FIGS. 2–4 and includes a movable carriage 31. Carriage 31 reciprocates back and forth along cam follower rails 32 located on opposite sides of carriage 31. Carriage 31 includes cam follower bearings 34 attached thereto which engage cam follower rails 32. Reciprocating movement of carriage 31 is controlled by drive mechanism 36.

Drive mechanism 36 includes a first sprocket 38 and a second sprocket 40 which are connected by a drive chain 42. Second sprocket 40 is rotated as illustrated by arrow 43 in FIGS. 3 and 4 by a shaft 44 coupled to a main drive bar (not shown) to synchronize movement of drive mechanism 36 with conveyor 22. Shaft 44 is coupled to the main drive bar by a drive chain 46. A connecting rod 48 is coupled at one end to carriage 31 at location 50. A second end of connecting bar 48 is coupled to drive chain 42 by a flying link 52. As sprockets 38 and 40 are rotated by chain 46 and chain 42, flying link 52 follows chain 42 around sprockets 38 and 40 as best illustrated in FIGS. 3 and 4. Carriage 31 moves a total distance equal to dimension 53 in FIG. 3.

Spreading apparatus 16 also includes a spreader head 54 pivotably coupled to carriage 31. Reciprocating movement of the spreader head 54 as illustrated in FIGS. 3 and 4 is controlled by a piston and cylinder arrangement 56. Piston and cylinder arrangement 56 controls movement of an actuator arm 58 which in turn controls reciprocating movement of the spreader head 54. A center section of lever arm 60 is pivotably coupled to carriage 31 at location 62. Lever arm 60 includes a first end pivotably coupled to actuator arm 58 at location 64 and a second end pivotably coupled to spreader head 54 at location 66. When actuator arm 58 is in its extended position as illustrated in FIG. 3, spreader head is lifted upwardly away from conveyor 22 in the direction of arrow 67. When the actuator arm 58 moves to its retracted position illustrated in FIG. 4, spreader head 54 moves downwardly toward conveyor 22 in the direction of arrow 68 so that spreaders or wheel assemblies 70 engage sauce 21 on crusts 20.

Wheel assemblies 70 are coupled to shafts 72 for spreading the sauce 21 on crusts 20. Shafts 72 are rotatably coupled to spreader head 54 by bearing assemblies 74. Shafts 72 are rotated in the direction of arrows 76 so that wheel assemblies 70 move in a circular pattern to spread the sauce 21 on crusts 20. A drive mechanism 78 for simultaneously rotating the six shafts 72 and wheel assemblies 70 coupled to spreader head 54 is best illustrated in FIG. 2. Drive mechanism 78 includes a motor 80 and a gear reducer 82. Illustratively, motor 80 is a 1 H.P motor, 1,500 RPM, 220-240 V, 3PH, 50 Hz motor available from Brook-Crompton. Illustratively, gear reducer 82 is a 20:1 ratio gear reducer, Model No. JPM-17-M-D80D-2.2-L-20-.75, available from Renold. Motor 80 rotates a drive shaft 84 and timing sprocket 86 to rotate a timing belt 88. Each of the six drive shafts 72 is rotated by main timing belt 88. Timing sprockets 90 are coupled to each shaft 72. Timing belts 92 are coupled to each of the timing sprockets 90 as illustrated in FIG. 2. A plurality of tension idler rollers 94 engage timing belts 92 to maintain a constant tension on timing belts 92. Drive shaft 84 and timing sprocket 86 are coupled to one sprocket 90 by timing belt 88. Therefore, motor 80 continuously rotates each of the shafts 72 in a counter clockwise direction illustrated by arrows 76 during operation of spreader 16. Alternately, motor 80 can rotate shafts 72 in a clockwise direction as discussed below.

Figure 7:
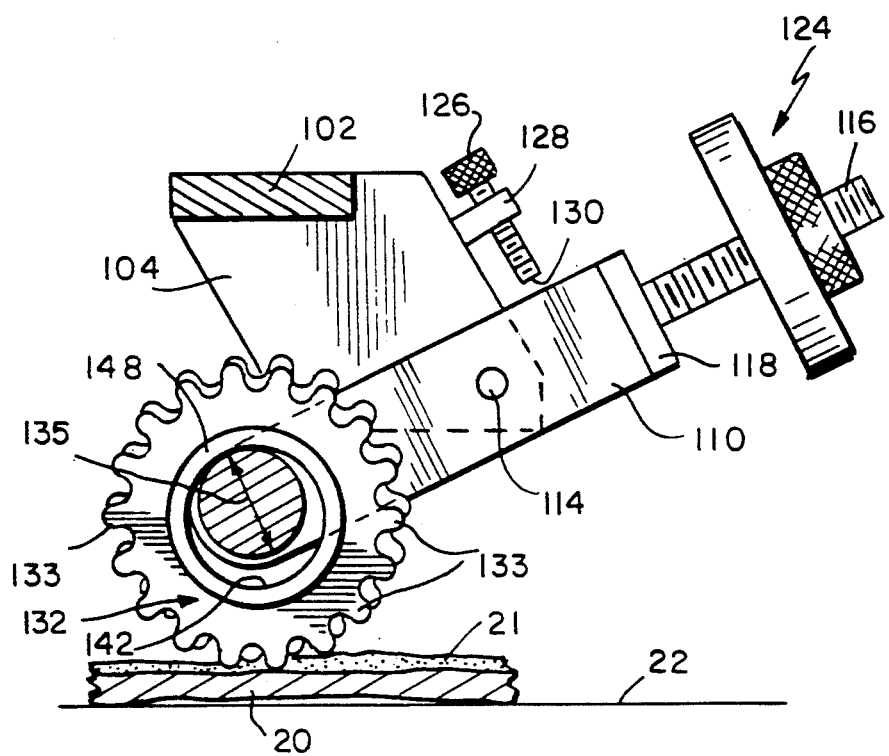
FIG. 7 is a sectional view taken along lines 7—7 of FIG. 6 further illustrating the configuration of the wheel assembly.

The configuration of wheel assemblies 70 is best illustrated in FIGS. 5-7. Wheel assembly 70 includes a main frame 100 including a generally horizontal center member 102 and first and second generally vertical end members 104 and 106 coupled to opposite ends of center member 102. An attachment post 108 is coupled to center member 102 in close proximity to second end 106. Attachment post 108 is coupled to one of a shaft 72 by fastener 109 as illustrated in FIG. 6. Support brackets 110 and 112 are pivotably coupled to frame ends 104 and 106, respectively, by fasteners 114. A plurality of discs or wheels 132 are positioned on axle 134. Axle 134 is coupled to brackets 110 and 112 by quick release fasteners 136 which extend through apertures 138 formed in brackets 110 and 112 and through apertures 140 in axle 134. Axle 134 has a predetermined diameter illustrated by dimension 135 in FIG. 7. Each of the wheels 132 includes an inner central aperture 142 having a diameter greater than the diameter 135 of axle 134. This permits limited movement of each of the wheels 132 relative to axle 134 during a spreading operation. Each of the wheels 132 are not coupled to adjacent wheels or to the brackets 110 and 112. Therefore, each wheel 132 is free to move independently of the remaining wheels 132. This is an important feature because crusts 20 often have domed centers or elevated portions within the crusts 20. As illustrated in FIG. 6, the crust 20 includes a raised or elevated portion 144. As wheel assembly 70 moves over the crust 20 to spread the sauce 21, the wheels 132 located above the elevated section 144 of crust 20 move upwardly in the direction of arrow 146. This permits even spreading of the sauce 21 despite an irregularity in the surface of the object or crust 20.

Axle 134 and wheels 132 are pivotable relative to frame 100 as illustrated by arrow 147 in FIG. 5. As discussed above, brackets 110 and 112 are pivotably coupled to frame 100 by fasteners 114. A threaded shaft 116 is coupled to an end 118 of bracket 110. A threaded shaft 120 is coupled to end 122 of bracket 112. Threaded counter weights 124 are adapted to be threadably secured to shafts 116 and 120 to balance the wheel assembly 70. Counter weights 124 are adjustable depending on the type of material or sauce being spread. Set screws 126 are threadably coupled to extension plates 128 mounted on the first and second ends 104 and 106 of frame 100 limit the range of pivotable movement of brackets 110 and 112 relative to frame 100. An end portion 130 of set screws 126 engages the first and second threaded shafts 116 and 120 to block pivotal movement of the brackets 110 and 112 beyond the position of end portion 130 as illustrated in FIG. 7. Therefore, axle 134 and wheels 132 are free to pivot relative to frame 100 upon engagement of wheels 132 with the sauce 21.

As best illustrated in FIG. 6, each of the wheels 132 is formed to include an integral spacer 148 thereon. The spacers 148 separate adjacent wheels 132 by predetermined distance illustrated by apertures or slots 150. In another embodiment, separate washers or spacers can be used between wheels 132. However, integral spacers 148 are preferred. The size of slots 150 between adjacent wheels is preselected depending upon the consistency or type of sauce 21 being spread by the wheel assembly 70. In FIG. 6, for instance, the distance 150 between adjacent wheels 132 near first bracket 110 is larger than the distance 150 between wheels 132 adjacent second bracket 112. The distance 150 between wheels 132 in the center of axle 134 is even smaller than the distance 150 between wheels adjacent the second bracket 112. Therefore, the predetermined distance 150 between wheels 132 varies depending on the location of the wheel 132 along the longitudinal axis of axle 134.

In other embodiments, wheels 132 adjacent second bracket 112 may be spaced further apart, while wheels 132 near first bracket 110 may be closer together. Instead of the three size variations in distance 150 illustrated in FIG. 2, there may be only two size differences. In addition, there can be a plurality of size differences in the distance 150 between adjacent wheels 132. For instance, a distance between wheels 132 can be gradually decreased from one end to another or gradually increased from one end to another. The preferred separation of the wheels 132 is determined by the properties of the particular material being spread by wheel assemblies 70.

As illustrated in FIG. 7, wheels 132 can be configured to include a plurality of teeth 133 spaced around the outer peripheral edge of each wheel 132. These teeth 133 are used on wheels 132 when there is no particulate matter in the sauce 21 being spread on crust 20. When there is particulate matter, such as meat pieces, vegetable pieces, or cheese in the sauce 21, round wheels with no teeth are used as illustrated in FIG. 5. When no particulate matter is contained in the sauce 168, each wheel assembly 70 is rotated in a clockwise direction illustrated by arrows 76 to "push" the sauce 21 along the top of pizza crust 20. However, when particulate matter is contained in the sauce 21, it has been determined that rotating the shafts 72 in a counter clockwise direction to "pull" the sauce 21 along crust 20 produces better spreading of the sauce 21 on the crust 20.

Rotation of wheel assemblies 76 about shaft 72 spreads the sauce 21 in a circular pattern on the generally circular crusts 20. As illustrated in FIG. 2, the crusts 20 are centered on conveyor 22 by alignment pegs 24. The timing of spreading apparatus 16 is synchronized by drive chain 46 with movement of conveyor of 22 so that shafts 72 are positioned substantially in the center of crusts 20 when the spreader head 54 moves to its extended position illustrated in FIG. 4. As illustrated in FIG. 6, a longitudinal axis 156 of shaft 72 is aligned over the center portion 158 of crust 20. Rotation of the wheel assemblies 70 spreads the sauce 21 to within a predetermined distance from an edge 152 of crust 20 as illustrated in FIG. 6. The predetermined distance is illustrated by dimension 154 in FIG. 6. By leaving the outer edge 154 of crust 20 uncovered, handling of the pizza is simplified. As illustrated in FIG. 2, sauce 21 is spread on a predetermined section of crust 20. The predetermined section is concentric with the circular crust 20.

The spreading apparatus 16 is adapted to accommodate crusts 20 having varying diameters. For crusts having large diameters, the entire axle 134 is covered with wheels 132 which engage the sauce 21 on crust 20. When the size of the crust 20 is reduced, wheels 132 are removed from axle 134 adjacent first bracket 110 and a spacer (not shown) which does not engage the sauce 21 is inserted on the axle 134. Different size spacers are added depending upon the size of the crust 20 being processed. By removing wheels 132 and applying a spacer, the same frame assembly 100 can be used for any size pizza crust.

In operation, pizza crusts 20 enter conveyor 22 from an inlet conveyor 12 in two spaced apart columns. Crusts 20 are aligned on conveyor 22 by alignment pegs 24. A dispenser 14 applies sauce 21 to each crust 20 continuously moving on conveyor 22. A sensor 26 generates a control signal upon detection of a leading edge of each crust 20 to cause a piston and cylinder arrangement 28 to dispense sauce 21 from hopper 29 through outlet nozzle 30. The timing of sensor 26 and dispenser 14 causes sauce to be applied to substantially the center of crusts 20. Conveyor 22 then moves the crusts 20 into spreading apparatus 16. As illustrated in FIG. 3, carriage 31 moves in the upstream direction illustrated by arrow 33 as the crusts 20 move in the downstream direction illustrated by arrow 35. Once the carriage 31 reaches its furthest upstream position as illustrated in FIG. 4, piston and cylinder arrangement 56 moves actuator arm 58 from its extended position illustrated in FIG. 3 to its retracted position illustrated in FIG. 4. Movement of actuator arm 58 to its retracted position causes spreader head 54 to move downwardly in the direction of arrow 68 so that wheel assemblies 70 engage sauce 21 on crusts 20. Each of the wheel assemblies 70 is continuously rotated by drive mechanism 78 illustrated in FIG. 2 to rotate shafts 72 and wheel assemblies 70 and a counter clockwise direction illustrated by arrows 76 in FIGS. 3 and 4 when the sauce 21 does not contain particulate matter. Shafts 72 are rotated in a clockwise direction for sauce 21 which includes particulate matter. With spreader head 54 in its extended position, carriage 31 begins movement in a downstream direction over crusts 20 in the direction of arrow 37 in FIG. 4. Conveyor 22 and carriage 31 move at substantially the same speed so that the shafts 72 remain centered over crusts 20 as the wheel assemblies 70 rotate to spread sauce 21. Wheel assemblies 70 make about two revolutions during the time that wheel assemblies 70 are engaged with sauce 21. A detailed discussion of the configuration and operation of wheel assemblies 70 is included above. After sauce 21 has been spread on crusts 20, piston and cylinder arrangement 56 moves actuator arm 58 to its extended position illustrated in FIG. 3. This lifts the spreader head 54 upward in the direction of arrow 67 so that wheel assemblies 70 disengage crusts 20 by moving in the direction of arrows 69 in FIG. 3. Carriage 31 then begins its upstream movement in the direction of arrow 33 as three additional rows of crusts 20 move into spreading apparatus 16. The cycle then repeats itself as sauce 21 on the next three rows of crusts 20 is spread by wheel assemblies 70 during the next cycle.

The preferred embodiment of the present invention includes a continuously moving conveyor 22 and a moving carriage 31 as discussed in detail above. It is understood, however, that conveyor 22 could be moved intermittently in accordance with the present invention in place of moving continuously. In the intermittently-moving embodiment, conveyor 22 would intermittently move a predetermined number of crusts 20 into the spreading apparatus 16. The carriage 31 would be positioned in a predetermined stationary position inside spreading apparatus 16. Each of the wheel assemblies 70 would be moved to a retracted position as illustrated in FIG. 3 as the conveyor intermittently moves the crusts 20 into the spreading apparatus 16. When the crusts 20 are positioned below the wheel assemblies 70, conveyor 22 would stop and piston and cylinder arrangement 56 would be actuated to move actuator arm 58 and spreader head 54 to move wheel assemblies 70 to their extended positions illustrated in FIG. 4. The rotating wheel assemblies 70 would then spread the sauce 21 on crusts 20. After the sauce 21 is spread on crusts 20, piston and cylinder arrangement 56 would move wheel assemblies 70 back to their retracted positions disengaged from sauce 21. The conveyor would then move the next set of crusts 20 into spreading apparatus 16 and the spreading cycle would be repeated for the next set of crusts 20.

Although the invention has been described in detail with reference to a certain preferred embodiment, variations and modifications exist within the scope and spirit of the invention as described and defined in the following claims.

What is claimed is:

1. An apparatus for spreading a material on an object, the apparatus comprising:
   a carriage;
   means for continuously moving the object in a downstream direction;
   means for moving the carriage in the downstream direction over the continuously moving object;
   a spreader coupled to the carriage for spreading the material on the object; and
   means for providing movement of the spreader relative to the carriage from a first position in which the spreader engages the material to a second position in which the spreader disengages the material.

2. The apparatus of claim 1, further comprising means for rotating the spreader relative to the carriage to spread the material on the object.

3. The apparatus of claim 2, further comprising a shaft having a proximal end rotatably coupled to the carriage and a distal end, the spreader being coupled the distal end of the shaft, and the rotating means being coupled to the shaft to rotate the shaft and the spreader relative to the carriage.

4. The apparatus of claim 1, wherein the carriage includes a carriage frame and a spreader head pivotably coupled to the carriage frame, and the means for providing movement of the spreader includes means for pivoting the spreader head relative to the carriage frame.

5. The apparatus of claim 4, wherein the means for pivoting the spreader head relative to the carriage frame includes a lever arm having a first end, a second end coupled to the spreader head, and a center section pivotably coupled to the carriage frame, and the means for pivoting the spreader head relative to the carriage frame also includes a piston and cylinder assembly having an actuator arm coupled to the first end of the lever arm, the actuator arm being movable from a first position to move the spreader head away from the carriage frame to extend the spreader to an second position to move the spreader head toward the carriage frame to retract the spreader.

6. The apparatus of claim 1, wherein the means for moving the carriage provides reciprocating movement of the carriage alternately in a downstream direction and in an upstream direction over a stream of continuously moving objects.

7. The apparatus of claim 6, wherein the means for providing movement of the spreader moves the spreader from an extended first position in which the spreader engages the material as the carriage moves in the downstream direction to a retracted second position in which the spreader disengages the material as the carriage moves in the upstream direction.

8. The apparatus of claim 1, further comprising means for aligning the spreader with an object below the carriage so that the spreader spreads material only on a predetermined section of the object.

9. The apparatus of claim 8, wherein the object has a substantially circular shape and the spreader is rotated the spread the material in a circular pattern on the object, the circular pattern being substantially concentric with the generally circular object.

10. The apparatus of claim 1, wherein the spreader includes a frame, an axle having a predetermined diameter coupled to the frame, and a plurality of wheels for engaging the material to spread the material on the surface, each of the wheels being formed to include a central aperture therethrough for receiving the axle to couple the wheels to the axle.

11. The apparatus of claim 10, wherein the central aperture of each wheel has a diameter larger than the predetermined diameter of the axle to permit limited movement of the wheels relative to the axle.

12. The apparatus of claim 10, wherein each of the plurality of wheels is spaced apart from an adjacent wheel by a predetermined distance.

13. The apparatus of claim 12, wherein the predetermined distance between adjacent wheels varies depending upon the location of the wheel along the longitudinal axis of the axle.

14. The apparatus of claim 12, wherein each wheel includes a spacer integrally formed thereon to separate each wheel from an adjacent wheel by said predetermined distance.

15. The apparatus of claim 10, further comprising means for pivotably coupling the axle and the plurality of wheels to the frame to permit pivotal movement of the axle and plurality of wheels relative to the frame upon engagement of the wheels with the material.

16. The apparatus of claim 15, further comprising a counterweight coupled the coupling means.

17. The apparatus of claim 15, further comprising means for limiting the range of pivotal movement of the axle and the plurality of wheels relative to the frame.

18. The apparatus of claim 10, wherein each of the wheels includes a plurality of teeth formed on an outer edge thereof to facilitate spreading material which includes particulate matter.

19. The apparatus of claim 10, wherein each of the wheels is formed to include a generally smooth outer edge to facilitate spreading of particulate-free material.

20. The apparatus of claim 10, wherein each of the plurality of wheels is free to move independently relative to an adjacent wheel to permit each of the plurality of wheels to move to a different position relative to the axle upon engagement of the wheels with the material.

21. An apparatus for spreading a material on a surface, the apparatus comprising:

a frame;

an axle having a predetermined diameter coupled to the frame;

a plurality of wheels for engaging the material to spread the material on the surface, each of the wheels being formed to include a central aperture therethrough for receiving the axle to couple the wheels to the axle, the central aperture of each wheel having a diameter larger than the predetermined diameter of the axle to permit limited movement of the wheels in a radially outward direction relative to the axle in response to contacting material located at varying levels on the surface, each of the plurality of wheels being spaced apart from an adjacent wheel by a predetermined distance which varies depending upon the location of the wheel along the longitudinal axis of the axle; and means coupled to the frame for moving the frame, axle, and plurality of wheels over the surface to spread the material.

22. The apparatus of claim 21, wherein each wheel includes a spacer integrally formed thereon to separate each wheel from an adjacent wheel by said predetermined distance.

23. The apparatus of claim 21, further comprising means for pivotably coupling the axle and the plurality of wheels to the frame to permit pivotal movement of the axle and plurality of wheels relative to the frame upon engagement of the wheels with the material.

24. The apparatus of claim 23, further comprising a counterweight coupled to the coupling means.

25. The apparatus of claim 23, further comprising means for limiting the range of pivotal movement of the axle and the plurality of wheels relative to the frame.

26. The apparatus of claim 21, wherein each of the plurality of wheels is free to move in a radially outward direction relative to the axle independently of an adjacent wheel to permit each of the plurality of wheels to move to a different radial position relative to the axle upon engagement of the wheels with a material.

27. The apparatus of claim 21, wherein each of the plurality of wheels is formed to include a plurality of teeth on an outer edge thereof to facilitate spreading material which includes particulate matter.

28. An apparatus for spreading a material on an object, the apparatus comprising:

a continuously moving conveyor for moving the object in a downstream direction;

a dispenser for applying the material to the object;

a carriage located above the conveyor;

means for moving the carriage in the downstream direction over the continuously moving object as the spreading means engage the material;

spreading means coupled to the carriage for engaging the material applied to the object by the dispenser to spread the material on the object; and means for providing movement of the spreading means relative to the carriage from an first position in which the spreading means engages the material to a second position in which the spreading means disengages the material.

29. The apparatus of claim 28, wherein the spreading means includes a shaft having a proximal end rotatably coupled to the carriage and a distal end and means for rotating the shaft relative to the carriage so that the spreading means rotates relative to the object to spread the material.

30. The apparatus of claim 28, further comprising means for aligning the object in a predetermined position on the conveyor and means cooperating with the aligning means on the conveyor for positioning the spreading means over an object travelling on the conveyor so that the spreading means spreads material only on a predetermined section of the object.

31. The apparatus of claim 28, wherein the means for moving the carriage provides reciprocating movement of the carriage alternately in a downstream direction and in an upstream direction over a stream of continuously moving objects.

32. The apparatus of claim 31, wherein the means for providing movement of the spreading means moves the spreading means from an extended first position in which the spreading engages the material as the carriage moves in the downstream direction to a retracted second position in which the spreading means disengages the material as the carriage moves in the upstream direction.

33. The apparatus of claim 28, wherein the carriage a carriage frame and a spreader head pivotably coupled to the carriage frame, and the means for providing movement of the spreading means includes means for pivoting the spreader head relative to the carriage frame, 34. The apparatus of claim 33, wherein the means for pivoting the spreader head relative to the carriage frame includes a lever arm having a first end, a second end coupled to the spreader head, and a center section pivotably coupled to the carriage frame, and the means for pivoting the spreader head relative to the carriage frame also includes a piston and cylinder assembly having an actuator arm coupled to the first end of the lever arm, the actuator arm being movable from a first position to move the spreader head away from the carriage frame to extend the spreading means to an second position to move the spreader head toward the carriage frame to retract the spreading means.

35. The apparatus of claim 28, wherein the spreading means includes a frame, an axle having a predetermined diameter coupled to the frame, and a plurality of wheels for engaging the material to spread the material on the surface, each of the wheels being formed to include a central aperture therethrough for receiving the axle to couple the wheels the axle.

36. The apparatus of claim 35, wherein the central aperture of each wheel has a diameter larger than the predetermined diameter of the axle to permit limited movement of the wheels relative to the axle.

37. The apparatus of claim 35, wherein each of the plurality of wheels is spaced apart from an adjacent wheel by a predetermined distance.

38. The apparatus of claim 37, wherein the predetermined distance between adjacent wheels varies depending upon the location of the wheel along the longitudinal axis of the axle.

39. The apparatus of claim 37, wherein each wheel includes a spacer integrally formed thereon to separate each wheel from an adjacent wheel by said predetermined distance.

40. The apparatus of claim 35, further comprising means for pivotably coupling the axle and the plurality of wheels to the frame to permit pivotal movement of the axle and plurality of wheels relative to the frame upon engagement of the wheels with the material.

41. The apparatus of claim 40, further comprising a counterweight coupled to the coupling means.

42. The apparatus of claim 40, further comprising means for limiting the range of pivotal movement of the axle and the plurality of wheels relative to the frame.

43. The apparatus of claim 35, wherein each of the wheels includes a plurality of-teeth formed on an outer edge thereof to facilitate spreading material which includes particulate matter.

44. The apparatus of claim 35, wherein each of the wheels is formed to include a generally smooth outer edge to facilitate spreading of particulate-free material.

45. The apparatus of claim 35, wherein each of the plurality of wheels is free to move independently relative to an adjacent wheel to permit each of the plurality of wheels to move to a different position relative to the axle upon engagement of the wheels with the material.

* * * * *